(12) United States Patent
Takimoto

(10) Patent No.: US 11,585,713 B2
(45) Date of Patent: Feb. 21, 2023

(54) PRESSURE SENSOR

(71) Applicant: SAGINOMIYA SEISAKUSHO, INC., Tokyo (JP)

(72) Inventor: Kazuya Takimoto, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 0 days.

(21) Appl. No.: 17/389,002

(22) Filed: Jul. 29, 2021

(65) Prior Publication Data

US 2021/0356344 A1 Nov. 18, 2021

Related U.S. Application Data

(62) Division of application No. 16/289,194, filed on Feb. 28, 2019, now Pat. No. 11,105,699.

(30) Foreign Application Priority Data

Mar. 15, 2018 (JP) .............................. JP2018-047833

(51) Int. Cl.
*G01L 19/06* (2006.01)

(52) U.S. Cl.
CPC ................................ *G01L 19/0627* (2013.01)

(58) Field of Classification Search
CPC ............ G01L 19/0069; G01L 19/0084; G01L 19/0627; G01L 19/148; G01L 19/069; G01L 19/147; G01L 19/14; G01L 19/0046; G01L 19/0645; G01D 11/245
See application file for complete search history.

(56) References Cited

U.S. PATENT DOCUMENTS

| | | |
|---|---|---|
| 2005/0013958 A1 | 1/2005 | Callahan |
| 2005/0210990 A1 | 9/2005 | Hayashi |
| 2008/0190209 A1 | 8/2008 | Baba |
| 2010/0089169 A1* | 4/2010 | Koehler ............... G01L 19/147 73/756 |
| 2011/0290030 A1* | 12/2011 | Willner ............... G01L 19/0627 73/720 |
| 2012/0238901 A1 | 9/2012 | Augustine |
| 2017/0181293 A1 | 6/2017 | Weidinger |
| 2017/0284886 A1 | 10/2017 | Okawa |

FOREIGN PATENT DOCUMENTS

| | | |
|---|---|---|
| JP | 04-048493 | 2/1992 |
| JP | 06-010837 | 1/1994 |
| JP | 2000-046674 | 2/2000 |
| JP | 2006-349651 | 12/2006 |

(Continued)

OTHER PUBLICATIONS

Japanese Office Action dated Oct. 15, 2021, from Japanese Patent Application No. 2021-089058.

(Continued)

*Primary Examiner* — John Fitzgerald
*Assistant Examiner* — Truong D Phan
(74) *Attorney, Agent, or Firm* — Workman Nydegger

(57) ABSTRACT

In a pressure sensor including a substrate supported by input-output terminals, the substrate is provided with a circular hole located substantially at its central part, and an arc-shaped communication hole formed adjacent to three through-holes to which three of lead pins are inserted and fixed, respectively.

13 Claims, 9 Drawing Sheets

(56) References Cited

FOREIGN PATENT DOCUMENTS

| | | |
|---|---|---|
| JP | 3987386 B2 | 7/2007 |
| JP | 2007-218858 | 8/2007 |
| JP | 2011247889 A | 12/2011 |
| JP | 2014016333 A | 1/2014 |
| JP | 5656319 B2 | 12/2014 |
| JP | 5656319 B2 * | 1/2015 |
| JP | 2015-121513 | 7/2015 |
| JP | 2015-215364 | 12/2015 |
| JP | 2016-206124 | 12/2016 |
| JP | 2017-194401 | 10/2017 |
| JP | 2017-198506 | 11/2017 |
| WO | 2015194105 A1 | 4/2017 |

OTHER PUBLICATIONS

Office Action dated Oct. 28, 2020 in corresponding Japanese Patent Application JP 2018-047833.

* cited by examiner

PRESSURE SENSOR

CROSS-REFERENCES TO RELATED APPLICATIONS

This application claims priority to U.S. patent application Ser. No. 16/289,194, filed Feb. 28, 2019, which claims the benefit of Japanese Patent Application No. 2018-047833, filed Mar. 15, 2018, which are hereby incorporated by reference herein in their entirety.

BACKGROUND OF THE INVENTION

Field of the Invention

The present invention relates to a pressure sensor including a substrate supported by input-output terminals.

Description of the Related Art

As disclosed in Japanese Patent No. 5656319, for example, a sensor unit constituting part of a liquid-sealed semiconductor pressure sensor is provided in a pressure chamber formed inside a metallic joint member joined to a housing (which is referred to as an element body in Japanese Patent No. 5656319) in a cover member. For example, such sensor unit comprises, as its main components: a diaphragm supported in the joint member and isolating the above-described pressure chamber from a liquid seal chamber to be described below; the liquid seal chamber formed above the diaphragm and storing silicone oil serving as a pressure transmission medium; a sensor chip provided in the liquid seal chamber and detecting a variation in pressure of the silicone oil which is caused through the diaphragm; a chip mounting member supporting the sensor chip; and eight lead pins transmitting an output signal from the sensor chip and supplying power to the sensor chip, and so forth. The lead pins serving as input-output terminals are fixed to inside of hermetic glass which is formed inside the housing (the element body) and to which the chip mounting member is fixed. There is a case where one end portion of each lead pin is inserted and fixed to a corresponding one of through-holes in the substrate that is located away upward from an upper end surface of the hermetic glass in order to facilitate soldering work (see FIG. 1). Hereby, the substrate is supported by the end portions of the lead pins. The other end portion of each lead pin projecting from a lower end surface of the hermetic glass is connected to the sensor chip by using a bonding wire. A conductive pattern on the above-described substrate is electrically connected to external lead lines.

A space inside the cover member defined above the chip mounting member and the housing (the element body) is filled with an adhesive in such a way that the adhesive covers and hermetically seals the substrate, the lead pins, and a part of the external lead lines. Herewith, because the adhesive put therein adheres to an inner peripheral surface of the cover member, the lead pins, the substrate, and an outer peripheral portion of the external lead lines, the adhesive prevents moisture such as dew condensation water and rainwater on surfaces of the adhesive and of the external lead lines from penetrating into the cover member from the outside.

SUMMARY OF THE INVENTION

In the pressure sensor as disclosed in Japanese Patent No. 5656319, when the adhesive is charged into a space between a lower surface of the substrate and end surfaces of the chip mounting member and of the housing (the element body) in the cover member, bubbles contained in the adhesive may stick to and remain around the lead pins located below the substrate. In this instance, if the adhesive is solidified in the state where the bubbles stick to and remain around the lead pins located below the substrate, the bubbles around the lead pins may be confined in the adhesive. Hereby, electrostatic strength around the lead pins may be deteriorated as a consequence of reduction in dielectric strength between the lead pins and the housing because the dielectric strength of air is inferior to that of the adhesive. Moreover, if the bubbles in the adhesive emerge on its uppermost surface of the adhesive visible from the outside during the hardening of the adhesive and the uppermost surface is hardened in a recessed state, as a consequence, the adhesive may develop a defect in appearance.

In view of the above-described problem, the present invention aims to provide a pressure sensor including a substrate supported by input-output terminals. The present invention can discharge bubbles contained in an adhesive put in a cover member easily from below a substrate in the cover member into an internal space of a sensor unit accommodating portion and into outside continuous with the internal space.

To achieve the above-described object, a pressure sensor according to the present invention includes: a sensor unit having a sensor chip for detecting a pressure and transmitting a detection output signal, at least one input-output terminal electrically coupled to the sensor chip, and a supporting member for supporting the sensor chip; a substrate supported by one end of the input-output terminal and electrically coupled to the input-output terminal; and a sensor unit accommodating portion filled with a sealant, for accommodating the substrate and the sensor unit. Wherein, the substrate includes at least one bubble discharge opening located adjacent to the input-output terminal, to the bubble discharge opening for discharging a bubble into an internal space of the sensor unit accommodating portion and into outside being continuous with the internal space when the sensor unit accommodating portion is filled with the sealant.

Moreover, another pressure sensor according to the present invention includes: a sensor unit having a sensor chip for detecting a pressure and transmitting a detection output signal, at least one input-output terminal electrically coupled to the sensor chip, and a supporting member for supporting the sensor chip; a connector electrically coupled to the input-output terminal; and a sensor unit accommodating portion filled with a sealant, for accommodating the connector and the sensor unit. Wherein, the connector includes at least one bubble discharge opening for discharging a bubble into an internal space of the sensor unit accommodating portion and into outside being continuous with the internal space when the sensor unit accommodating portion is filled with the sealant. This pressure sensor may further include a substrate supported by one end of the input-output terminal and electrically coupled to the input-output terminal, and the substrate may include at least one bubble discharge opening located adjacent to the input-output terminal, for discharging the bubble into the internal space of the sensor unit accommodating portion and into the outside being continuous with the internal space when the sensor unit accommodating portion is filled with the sealant.

A plurality of bubble discharge openings may be formed between an outer peripheral portion at a lower end of a connection port portion and an inner peripheral portion of a terminal base in the connector at predetermined intervals along a circumferential direction of the connection port portion.

The sensor unit may further include a housing having an insulating member for supporting the input-output terminal.

The supporting member may be a sensor housing.

The bubble discharge opening may be either a communication hole in the substrate or a cutout on the substrate.

The bubble discharge opening may be provided adjacent to a terminal out of the input-output terminals which is solder-fixed to the substrate. The supporting member may be a chip mounting member made of a metal and supported and insulated from the sensor unit.

According to the pressure sensor of the present invention, the substrate includes at least one bubble discharge opening located adjacent to the input-output terminal that is solder-fixed to the substrate and discharges the bubble into the internal space of the sensor unit accommodating portion when the sensor unit accommodating portion is filled with the sealant. This makes it possible to discharge bubbles contained in an adhesive put in a cover member serving as the sensor unit accommodating portion easily from below the substrate in the cover member to the internal space of the sensor unit accommodating portion and to the outside continuous with the internal space.

Further features of the present invention will become apparent from the following description of exemplary embodiments with reference to the attached drawings.

DESCRIPTION OF THE EMBODIMENTS

Figure 2:
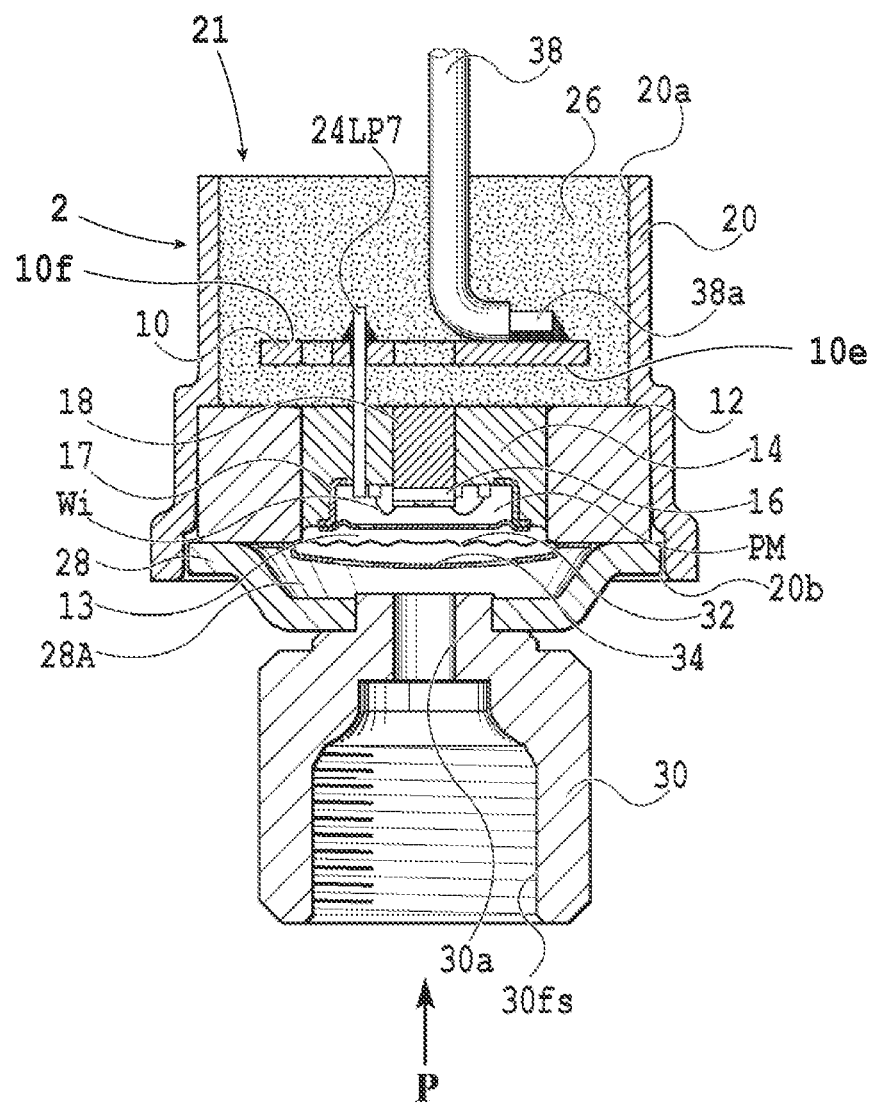
FIG. 2 is a cross-sectional view showing a configuration of the example of the pressure sensor according to the present invention.

FIG. 2 schematically illustrates a configuration of an example of a pressure sensor according to the present invention.

In FIG. 2, a pressure sensor comprises a joint member 30 to be joined to a piping that guides a fluid to be subjected to detection of a pressure, and a sensor unit accommodating portion 2 connected to a base plate 28 of the joint member 30, the sensor unit accommodating portion 2 for accommodating a sensor unit to be described later and supplying a detection output signal from a sensor chip 16 to a given pressure measurement device.

The joint member 30 made of a metal has a female screw portion 30fs provided on the inside of the joint member 30 and being screwed into a male screw portion provided at a connector portion of the above-described piping. The female screw portion 30fs communicates with a port 30a of the joint member 30 which guides the fluid supplied from a direction indicated with an arrow P to a pressure chamber 28A to be described later. One of open ends of the port 30a is open toward the pressure chamber 28A to be formed between the base plate 28 of the joint member 30 and a diaphragm 32 of the sensor unit.

A contour portion of the sensor unit accommodating portion 2 is formed by a cylindrical waterproof case 20 that serves as a cover member. An opening 20b is formed at a lower end portion of the waterproof case 20 made of a resin. A peripheral edge of the base plate 28 of the joint member 30 is engaged with a stepped portion on a peripheral edge of the opening 20b located inside.

Either air or a liquid being the fluid is supplied into the pressure chamber 28A through the port 30a of the joint member 30. A lower end surface of a housing 12 of the sensor unit is placed on the base plate 28.

The sensor unit for detecting a pressure inside the pressure chamber 28A and transmitting the detection output signal comprises, as its main components: the housing 12 in a cylindrical shape; the metal diaphragm 32 for isolating the pressure chamber 28A from an inner peripheral portion of the housing 12; the sensor chip 16 having a plurality of pressure detection elements; a metal chip mounting member 18 for supporting the sensor chip 16 at one end portion thereof through an adhesive layer; lead pins 24LP1, 24LP2, 24LP3, 24LP4, 24LP5, 24LP6, 24LP7, and 24LP8 (see FIG. 1) being electrically coupled to the sensor chip 16 and constituting grouped input-output terminals; and hermetic glass 14 for fixing the grouped input-output terminals and an oil filler pipe 22 (see FIG. 1) between an outer peripheral surface of the chip mounting member 18 and an inner peripheral surface of the housing 12.

Note that FIG. 2 representatively illustrates only the lead pin 24LP7 out of the lead pins 24LP1 to 24LP8, and does not illustrate the oil filler pipe. An outer peripheral edge of the diaphragm 32 is supported by one of lower end surfaces of the housing 12 opposed to the aforementioned pressure chamber 28A. A diaphragm protection cover 34 to protect the diaphragm 32 provided in the pressure chamber 28A is provided with a plurality of communication holes. A peripheral edge of the diaphragm protection cover 34 is joined by welding to the lower end surface of the housing 12, which is made of stainless steel, together with the outer peripheral edge of the diaphragm 32.

A liquid seal chamber 13 formed between the sensor chip 16 opposed to the metallic diaphragm 32 and an end surface of the hermetic glass 14 is filled, for example, with a predetermined amount of silicone oil or a fluorine-based inert liquid serving as a pressure transmission medium PM through the oil filler pipe 22. Note that one of end portions of the oil filler pipe 22 is crushed and occluded after the filling with the oil.

An electric potential adjustment member 17 made of a metal is further supported on the lower end surface of the hermetic glass 14 between the diaphragm 32 and the sensor chip 16 which is provided in a recess formed at an end portion of the hermetic glass 14 that serves as an insulating member. The electric potential adjustment member 17 having a communication hole is coupled to a terminal connected to zero potential of a circuit of the sensor chip 16 as disclosed in Japanese Patent No. 3987386, for example.

Note that the insulating member to fix the grouped input-output terminals and the oil filler pipe 22 (see FIG. 1) between the outer peripheral surface of the chip mounting member 18 and the inner peripheral surface of the housing 12 is not limited to the above-described example. For instance, a ceramic, a heat resistant resin or the like that secures the airtightness of the liquid seal chamber 13 while establishing insulation of the grouped input-output terminals and the like may be used instead.

The lead pin 24LP6 and the lead pin 24LP7 are used as two power supply terminals (Vcc, GND), for example. The lead pin 24LP8 is used as a transmission terminal (Vout) for the output signal from the sensor chip 16, for example. The lead pins 24LP1 to 24LP5 are used as five adjustment terminals, respectively. Both end portions of each of the lead pins 24LP1 to 24LP5 project toward the above-described recess formed at the end portion of the hermetic glass 14 and a corresponding one of through-holes 10*ai* (i=1 to 8) in a substrate 10 to be described later. Note that the number of the lead pins is not limited to this example and may be set as appropriate according to the number of input-output ports of the sensor chip 16, for instance.

Both end portions of each of the lead pin 24LP6, the lead pin 24LP7, and the lead pin 24LP8 project toward the above-described recess formed at the end portion of the hermetic glass 14 and a corresponding one of the through-holes 10*ai* (i=1 to 8) in the substrate 10 to be described later. At that time, the end portions of the lead pin 24LP6, the lead pin 24LP7, and the lead pin 24LP8 inserted into the corresponding through-holes 10*ai* in the substrate 10 are solder-fixed to peripheral edge of each through-hole 10*ai* in the substrate 10, respectively.

Figure 1:
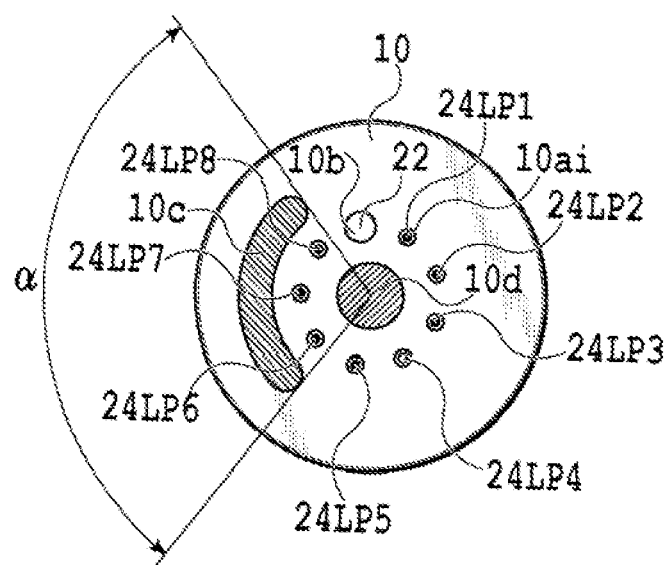
FIG. 1 is a plan view showing a substrate to be used in an example of a pressure sensor according to the present invention together with lead pins provided thereto.

As shown in FIG. 1, for example, the substrate 10 is formed into a disc shape and is provided with a circular hole 10*d* located substantially at a central portion as a first bubble discharge opening. Moreover, the substrate 10 has the through-holes 10*ai*, and a through-hole 10*b* into which the oil filler pipe 22 is inserted. Predetermined circumferential equally spaced apart above-described lead pins 24LP1 to 24LP8 are inserted into the through-holes 10*ai* each with a given gap around the hole 10*d*. The predetermined equally spacing is set at 40° spacing, for instance.

Moreover, an arc-shaped communication hole 10*c* serving as a second bubble discharge opening is formed adjacent to the three through-holes 10*ai* into which the lead pin 24LP6, the lead pin 24LP7, and the lead pin 24LP8 are inserted, respectively. The arc of the communication hole 10*c* has a predetermined center angle $\alpha$. The center angle $\alpha$ is set at 90°, for example. As shown in FIG. 2, a conductive pattern on the substrate 10 is formed in an area from the through-holes 10*ai* into which the lead pins 24LP6 to 24LP8 are inserted and solder-fixed to a position where a core wire 38*a* of a lead line 38 is connected to the substrate. The lead line 38 is connected to the given pressure measurement device (not shown). While the shape of the substrate 10 is formed into the circular shape, the present invention is not limited only to this example and the shape of the substrate 10 may be formed into a polygonal shape, for instance.

Herein, the sensor chip 16 is adapted to use one provided with a diaphragm portion inside such as in a piezoresistive effect system. The sensor chip 16 adopting a piezoresistive effect mainly comprises a semiconductor substrate unit which is provided with a diaphragm portion made of a material (such as single crystal silicon) that has the piezoresistive effect, and a mount made of glass or the like. The semiconductor substrate unit and the mount are bonded to each other by anodic bonding or the like, and a space between the diaphragm portion of the semiconductor substrate unit and the mount forms a reference pressure chamber. The diaphragm portion of the semiconductor substrate unit is provided with semiconductor strain gauges and a bridge circuit is formed by bridge-connecting these semiconductor strain gauges. A deformation of the diaphragm portion caused by a difference between an outside air pressure and the pressure in the reference pressure chamber is taken in the form of an electric signal representing a change in gauge resistance among the semiconductor strain gauges by this bridge circuit. As a consequence, a pressure of the fluid is detected by the bridge circuit. As shown in FIG. 2, the sensor chip 16 and the lead pins 24LP1 to 24LP8 are connected to one another by using bonding wires Wi.

Moreover, an internal space 21 surrounded by an inner peripheral surface 20*a* of the waterproof case 20, the housing 12, and an upper end surface of the hermetic glass 14 is filled with a predetermined amount of a sealant 26. The sealant 26 comprises an addition reaction type adhesive such as a urethane-based adhesive or an epoxy-based adhesive, for example.

Figure 3:
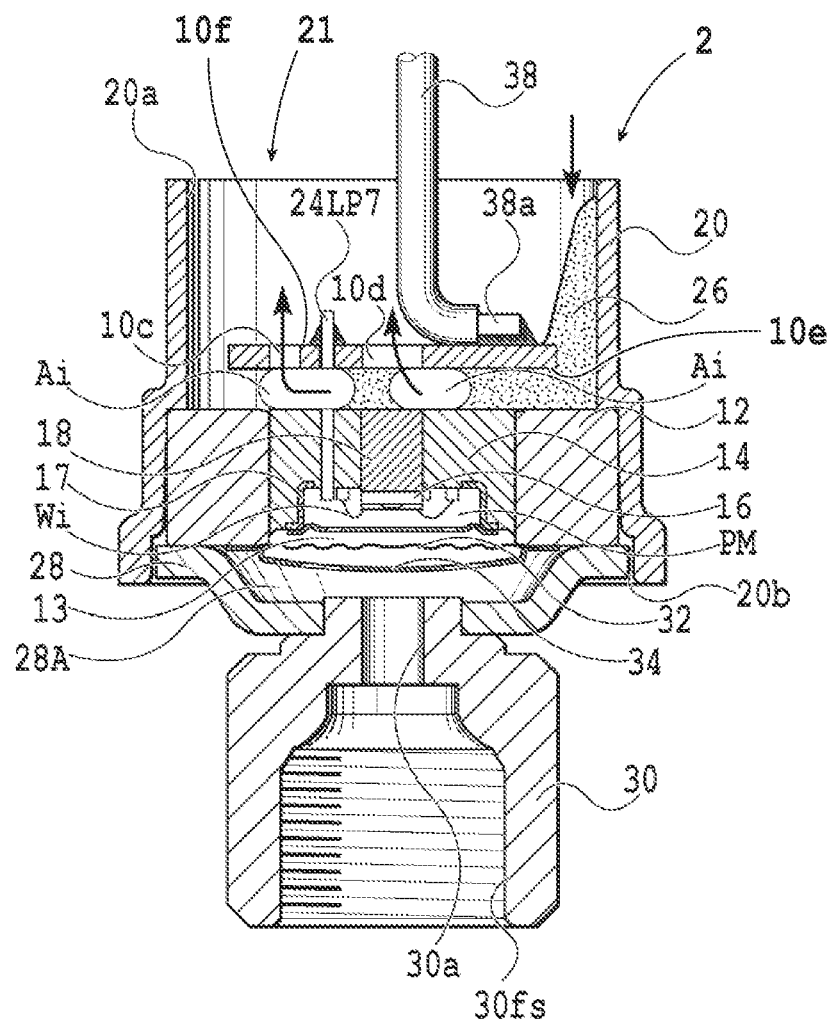
FIG. 3 is a cross-sectional view made available for describing a method of filling with a sealant in the example shown in FIG. 2.

In the above-described configuration, when the sensor unit is arranged in the waterproof case 20 and the core wire 38*a* of the lead line 38 is connected to the substrate 10, and then the sealant 26 is put into the waterproof case 20 in a direction indicated with arrows in FIG. 3, for example, even if bubbles Ai are taken in the sealant 26 that is put into a gap between the upper end surface of the housing 12, the hermetic glass 14 and a lower surface of the substrate 10, the bubbles Ai are pushed out by the sealant 26 from a first side 10*e* of the substrate 10 to the internal space 21 located on a second side 10*f* of the substrate 10 above the substrate 10 through the hole 10*d* in the substrate 10 without remaining in the space, and are easily pushed out and discharged to the internal space 21 located thereabove through the communication hole 10*c*. Hence, no bubbles Ai will remain in the sealant 26 when the sealant 26 is solidified, thus preventing a situation where the undesired bubbles Ai that may bring about the deterioration in electrostatic strength are confined in the sealant 26 near the lead pin 24LP6, the lead pin 24LP7, and the lead pin 24LP8.

Figure 4:
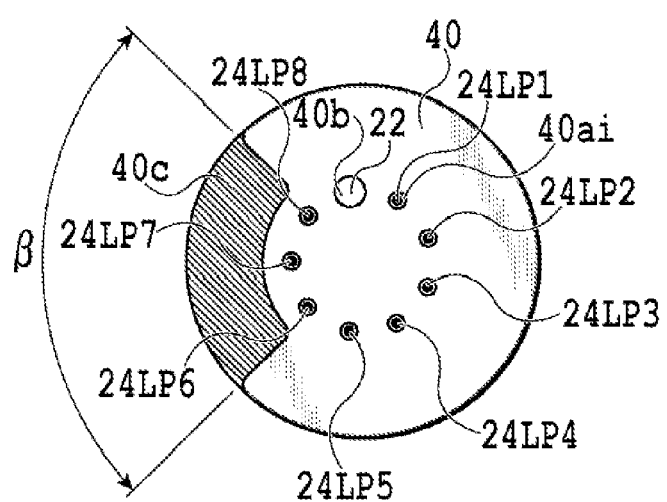
FIG. 4 is a plan view showing another example of the substrate to be used in the example shown in FIG. 2 together with the lead pins provided thereto.

Note that the bubble discharge openings in the substrate 10 are not limited to the aforementioned examples. Such an opening may be a cutout 40*c* as shown in FIG. 4, for instance. Components in FIG. 4 identical to the components shown in FIG. 1 will be denoted by identical reference numerals and overlapping explanations thereof will be omitted.

In FIG. 4, a substrate 40 is formed into a disc shape, for example. The substrate 40 includes through-holes 40*ai* (i=1 to 8) into which predetermined circumferential equally spaced apart above-described lead pins 24LP1 to 24LP8 are inserted each with a given gap, and a through-hole 40*b* into which the oil filler pipe 22 is inserted. Moreover, the cutout 40*c* in a fan-shape serving as the bubble discharge opening is formed adjacent to three of the through-holes 40*ai* into which the lead pin 24LP6, the lead pin 24LP7, and the lead pin 24LP8 are inserted, respectively. The arc of the cutout 40*c* has a prescribed center angle $\beta$. The center angle $\beta$ is set at about 90°, for example. A conductive pattern on the substrate 40 is formed in an area from the through-holes 40*ai* into which the lead pins 24LP6 to 24LP8 are inserted and solder-fixed to the position where the core wire 38a of the lead line 38 is connected to the substrate. While the substrate 40 is shaped like the circular shape, the shape of the substrate is not limited only to this example and the substrate 40 may be shaped like a polygonal shape, for instance. In addition, while the cutout 40c is shaped like the arc shape, the shape of the cutout is not limited only to this example and the cutout 40c may be shaped like any of a rectangular cutout provided at least one position, a cutout having a partial cut-off V-shape or D shape, and the like. The lead line 38 is connected to the given pressure measurement device (not shown).

Note that the cutout 40c is formed at the same distance away from the three through-holes 40ai into which the solder-fixed lead pins 24LP6, 24LP7, and 24LP8 are inserted, respectively. However, the present invention is not limited only to this example. For instance, the cutout 40c may be formed away from the three through holes 40ai at different distances from one another.

In the above-described configuration, when the sensor unit is arranged in the waterproof case 20 and the core wire 38a of the lead line 38 is connected to the substrate 40, and then the sealant 26 is put into the waterproof case 20, even if the bubbles are taken in the sealant 26 that is put into the gap between the upper end surface of the housing 12, the hermetic glass 14 and a lower surface of the substrate 40, the bubbles are passed through the cutout 40c on the substrate 40 without remaining in the space and are easily pushed out by the sealant 26 and discharged to the internal space 21 located thereabove. Hence, no bubbles Ai will remain in the sealant 26 when the sealant 26 is solidified, thus preventing the situation where the undesired bubbles Ai that may bring about the deterioration in electrostatic strength are confined in the sealant 26 near the lead pin 24LP6, the lead pin 24LP7, and the lead pin 24LP8.

Note that each of the hole 10d, the communication hole 10c, and the cutout 40c is provided at one position in the substrate 10 or the substrate 40 in the above-described examples. However, the present invention is not limited only to these examples and the communication holes 10c or the cutouts 40c may be provided at two or more positions, for instance. Further, the bubble discharge opening may be a combination of the hole 10d, the communication hole 10c, and/or the cutout 40c as appropriate.

Figure 5:
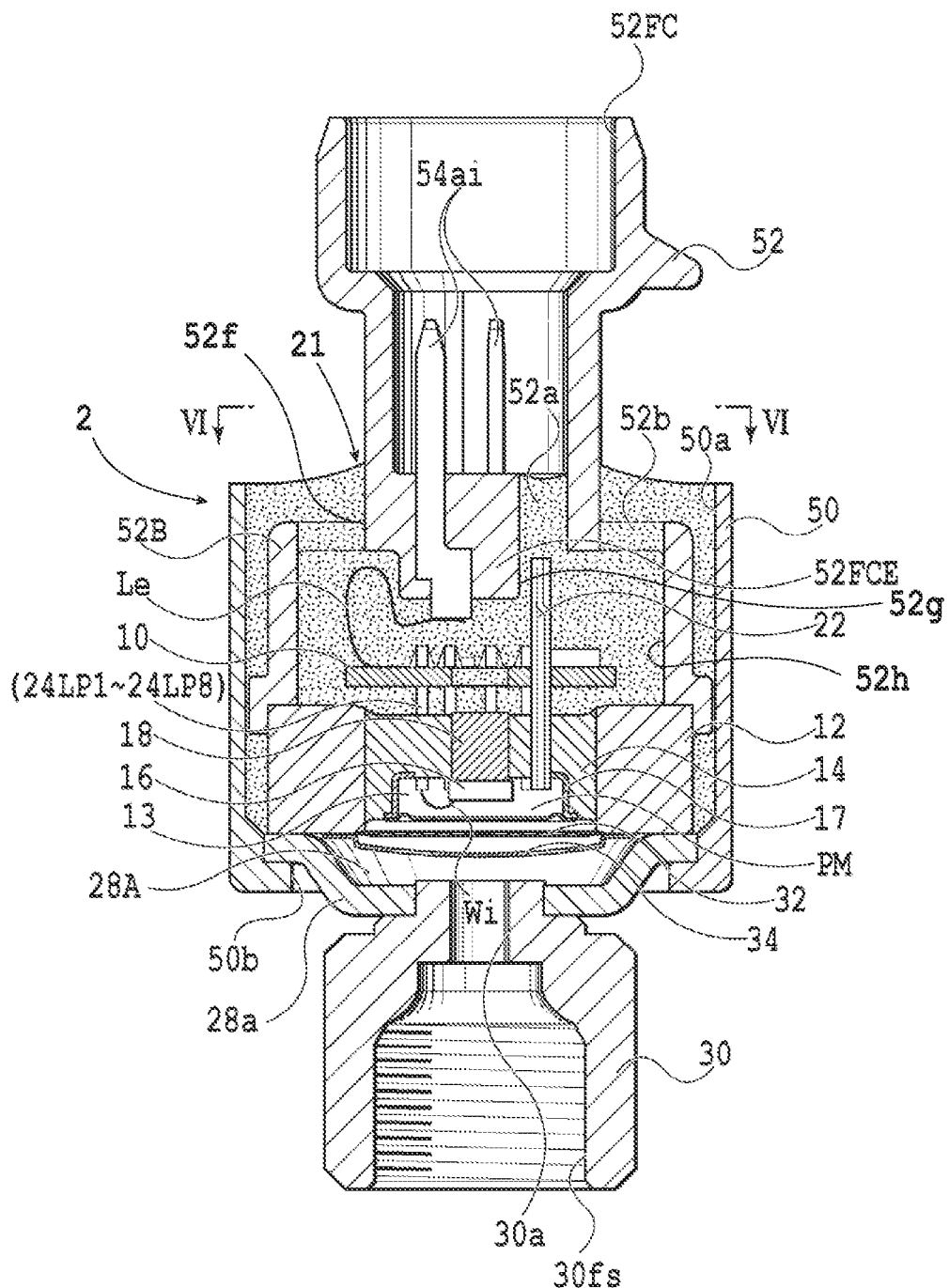
FIG. 5 is a cross-sectional view showing a configuration of another example of a pressure sensor according to the present invention.

FIG. 5 schematically shows a configuration of another example of a pressure sensor according to the present invention. Note that components in FIG. 5 identical to the components shown in the example illustrated in FIG. 2 will be denoted by identical reference numerals and overlapping explanations thereof will be omitted.

In the example shown in FIG. 2, the lead line 38 to be connected to the conductive pattern on the substrate 10 is directly coupled to the given pressure measurement device (not shown). On the other hand, in the example shown in FIG. 5, a lead line Le to be connected to the conductive pattern on the substrate 10 is coupled to the pressure measurement device (not shown) through a connector 52. Note that as with the example show in FIG. 1, the substrate 10 has the through-holes 10ai (i=1 to 8) and the through-hole 10b which are located at the positions corresponding to the lead pins 24LP1 to 24LP8 and the oil filler pipe 22, respectively, and moreover, the hole 10d and the communication hole 10c serving as the bubble discharge openings. The through-holes 10ai as well as the through-hole 10b, the hole 10d, and the communication hole 10c are arranged at predetermined intervals, respectively.

In FIG. 5, the pressure sensor comprises the joint member 30 to be connected to the piping that guides the fluid to be subjected to detection of a pressure, and the sensor unit accommodating portion 2 connected to the base plate 28 of the joint member 30, the sensor unit accommodating portion 2 for accommodating the sensor unit and supplying the detection output signal from the sensor chip 16 to the given pressure measurement device. The contour portion of the sensor unit accommodating portion 2 is formed by a cylindrical waterproof case 50 serving as a cover member. An opening 50b is formed at a lower end portion of the waterproof case 50 made of a resin. The peripheral edge of the base plate 28 of the joint member 30 is engaged with a stepped portion on a peripheral edge of the opening 50b located inside.

In addition, the female connector 52 to be fitted with an outer peripheral portion of the housing 12 is molded by using a resin material. The female connector 52 comprises a connection port portion 52FC which is attachable to and detachable from a male connector (not shown), and a terminal base 52B formed integrally with a base part of the connection port portion 52FC, the terminal base 52B for supporting connection terminals 54ai (i=1 to 3). A lower part of the terminal base 52B having a stepped cylindrical shape is fitted with the outer peripheral portion of the housing 12. The substrate 10, the lead pins 24LP1 to 24LP8, and the oil filler pipe 22 which are described above are arranged at a central part inside the terminal base 52B. The conductive pattern on the substrate 10 is connected to the connection terminals 54ai (i=1 to 3) through the lead line Le. Herein, although the connector 52 is provided by forming the connection port portion 52FC integrally with the terminal base 52B, the connector is not limited to this example and the connection port portion 52FC and the terminal base 52B may be formed separately from each other and then assembled together.

Figure 6:
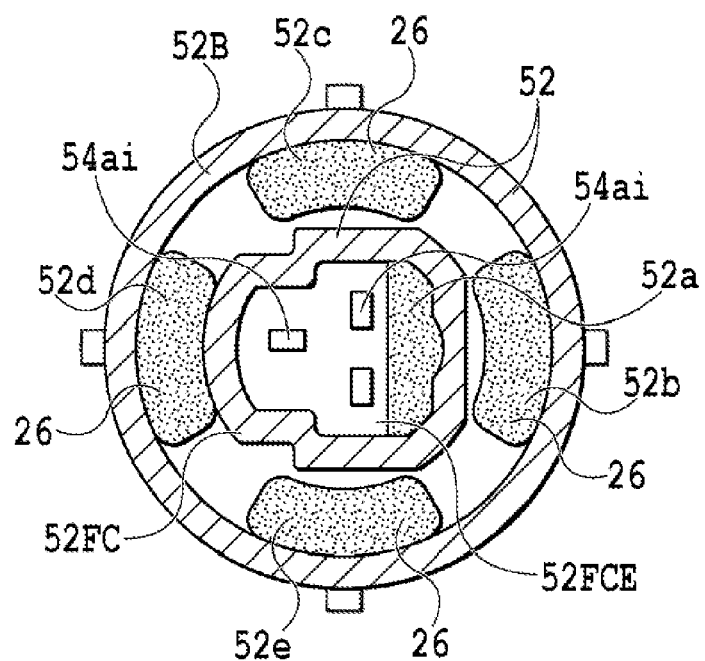
FIG. 6 is a partial cross-sectional view showing a connector unit illustrated in FIG. 5, which is taken along the VI-VI line.

The connection terminals 54ai are supported by a terminal support portion 52FCE formed inside of a lower end of the connection port portion 52FC having the stepped cylindrical shape. Each connection terminal 54ai is supported in such a way as to be parallel to the center axis of the connection port portion 52FC. As shown in FIG. 6, an opening 52a serving as a first bubble discharge opening is formed between an inner peripheral portion of the connection port portion 52FC and the terminal support portion 52FCE.

Moreover, a communication hole 52b serving as a second bubble discharge opening, a communication hole 52c serving as a third bubble discharge opening, a communication hole 52d serving as a fourth bubble discharge opening, and a communication hole 52e serving as a fifth bubble discharge opening are formed between an outer peripheral portion 52f at a lower end 52g of the connection port portion 52FC and a cylindrical portion of the terminal base 52B, equally spaced apart at about 90° along a circumferential direction of the connection port portion 52FC.

A space between an inner peripheral surface 50a of the waterproof case 50 and an outer peripheral portion 52f at a lower part 52g of the connection port portion 52FC and the terminal base 52B of the connector 52, and an internal space 21 surrounded by an inner peripheral surface 52h of the terminal base 52B and the upper end surface of the hermetic glass 14 as well as the housing 12 are filled with a predetermined amount of the sealant 26. Hereby, the opening 52a, and the communication holes 52b to 52e are also filled with the sealant 26.

In the above-described configuration, when the sensor unit is arranged in the waterproof case 50 and the lead line Le is connected to the substrate 10 as well as the connection terminals 54ai and then the sealant 26 is put into the waterproof case 50, even if bubbles are taken in the sealant 26 that is put into the inside of the terminal base 52B, the bubbles are easily pushed out and discharged to the internal space 21 located thereabove through the opening 52a and the communication holes 52b to 52e without remaining in the sealant 26. Accordingly, it is possible to keep the bubbles from remaining and causing depressions on the surface of the sealant 26 in the case of solidification of the sealant 26. Thus, the sealant 26 can be kept from being solidified with its surface in the recessed state.

Moreover, as a consequence of using the substrate 10, when the sealant 26 is put into the waterproof case 50, the bubbles Ai do not remain in the sealant and are discharged from a first side 10e of the substrate 10 to the internal space 21 located on a second side 10f of the substrate 10 through the hole 10d and the communication hole 10c in the substrate 10. Hence, when the sealant 26 is hardened, the undesired bubbles Ai that may bring about the deterioration in electrostatic strength are kept from being confined in the sealant 26 near the lead pins 24LP1 to 24LP8.

Figure 7:
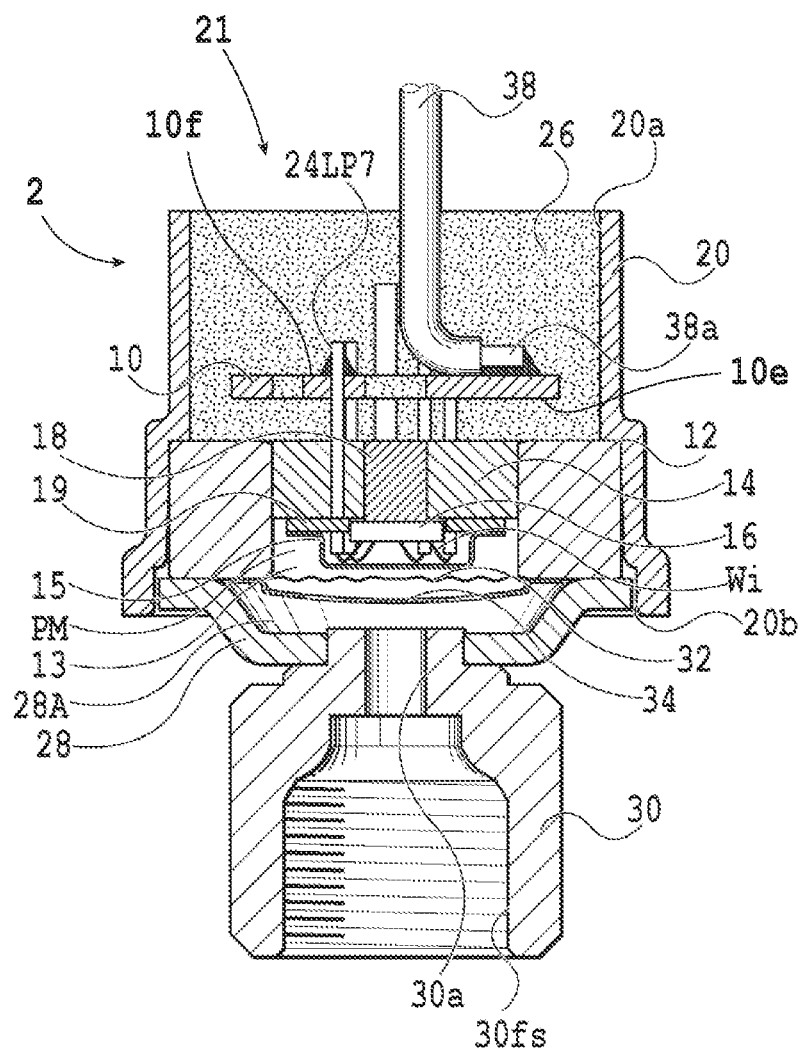
FIG. 7 is a cross-sectional view showing a configuration of still another example of a pressure sensor according to the present invention.

FIG. 7 schematically shows a configuration of still another example of a pressure sensor according to the present invention. The example shown in FIG. 2 has the configuration in which the metallic electric potential adjustment member 17 is supported on the lower end surface of the hermetic glass 14. Instead, in the example shown in FIG. 7, a shield member 15 serving as an electric field shielding member is provided between one of end surfaces of the sensor chip 16 and the diaphragm 32 in the liquid seal chamber 13. The shield member 15 in a cap shape is designed to shield an undesired electric field applicable to a signal processing electronic circuit unit in the sensor chip 16.

Note that components in FIG. 7 identical to the components shown in the example illustrated in FIG. 2 will be denoted by identical reference numerals and overlapping explanations thereof will be omitted.

The shield member 15 may be made from a conductive metal material such as stainless steel, copper, and aluminum. Alternatively, the shield member 15 may be made from an insulating material such as a resin, glass, and a ceramic and then integrated with a surface layer of a conductive metal deposited by adhesion, vapor deposition, sputtering, plating, and the like.

Four fixation end portions of the shield member 15 are brought close to an outer peripheral portion of the sensor chip 16 on one of end surfaces of a disc-shaped conductive plate 19, and are joined to and electrically coupled thereto. Although illustration is omitted, a plurality of openings are provided in a side surface of the shield member 15. The shape of the shield member 15 is formed into a shape that enables movement of the pressure transmission medium PM such that a pressure corresponding to a displacement of the diaphragm 32 is transmitted to the sensor chip 16 through the pressure transmission medium PM.

The conductive plate 19 is connected and electrically coupled to at least one of the lead pins 24LP1 to 24LP8, such as a zero (V) terminal through the bonding wire Wi. In this configuration, electric potentials at the shield member 15 and the conductive plate 19 are set equal to an electric potential in an electronic circuit mounted on the sensor chip 16.

A portion of the shield member 15 that covers the entire sensor chip 16 is provided with a prescribed clearance between the end surface of the sensor chip 16 and the portion of the shield member. Note that an external length of the shield member 15 may be set as appropriate according to the size of the signal processing electronic circuit unit of the sensor chip 16 so as to shield the undesired electric field applicable to the signal processing electronic circuit unit of the sensor chip 16.

Accordingly, by arranging the shield member 15 having the same electric potential as the electric potential of the sensor chip 16 between the diaphragm 32 and the signal processing electronic circuit unit of the sensor chip 16, the electric field to be applied to the sensor chip 16, which is generated by a difference in potential between a control circuit (not shown) side and the diaphragm 32 having the same electric potential as that of a primary power source (not shown) of the unit, is shielded by the shield member 15. In addition, because the shield member 15 and the sensor chip 16 have the same electric potential, no electric field is generated therebetween. For this reason, because the difference in potential that occurs between the sensor chip 16 and the diaphragm 32 is not applied to the sensor chip 16, it is possible to prevent the electronic circuit in the sensor chip 16 from being affected.

Figure 8:
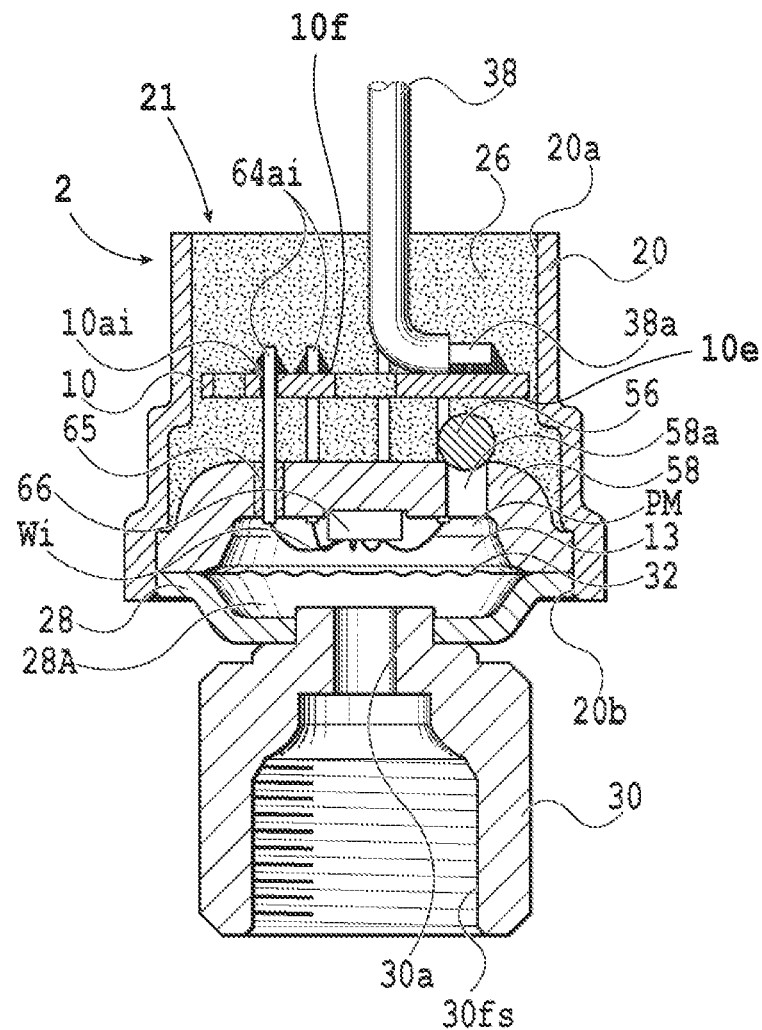
FIG. 8 is a cross-sectional view showing a configuration of still another example of a pressure sensor according to the present invention.

FIG. 8 schematically shows a configuration of still another example of a pressure sensor according to the present invention. The pressure sensor shown in FIG. 8 comprises the joint member 30 to be joined to the piping that guides the fluid to be subjected to detection of a pressure, and a metal sensor housing 58 in which the joint member 30 is connected to the base plate 28 by brazed joint or the like, the sensor housing 58 for accommodating the sensor unit.

Note that components in FIG. 8 identical to the components shown in the example illustrated in FIG. 2 will be denoted by identical reference numerals and overlapping explanations thereof will be omitted.

The sensor unit for detecting a pressure inside the pressure chamber 28A and transmitting the detection output signal comprises, as its main components: the metal diaphragm 32 for isolating the pressure chamber 28A from an inner peripheral portion of the sensor housing 58; a sensor chip 66 provided with a plurality of pressure detection elements and the signal processing electronic circuit unit for processing signals from the pressure detection elements; and grouped input-output terminals 64ai (i=1 to 8) electrically coupled to the sensor chip 66.

The pressure transmission medium PM is put in through a hole 58a in the sensor housing 58 and then the hole 58a is occluded by a plug member 56. The grouped input-output terminals 64ai are supported by being insulated from the sensor housing 58 through hermetic glass 65. The sensor chip 66 is cemented to an inner peripheral surface of the sensor housing 58. The grouped input-output terminals 64ai and the sensor chip 66 are connected to one another by using the bonding wires Wi.

Two of the grouped input-output terminals 64ai are used as power supply terminals (Vcc, GND), for example, and another one of the grouped input-output terminals 64ai is used as a transmission terminal (Vout) for the output signal from the sensor chip 66, for example. The rest of the terminals are used as the five adjustment terminals, respectively. Both end portions of each input-output terminal project toward an end portion of the hermetic glass 65 on an inner peripheral surface of the above-described sensor housing 58, and to the corresponding one of the through-holes 10ai (i=1 to 8) in the substrate 10, respectively.

Figure 9:
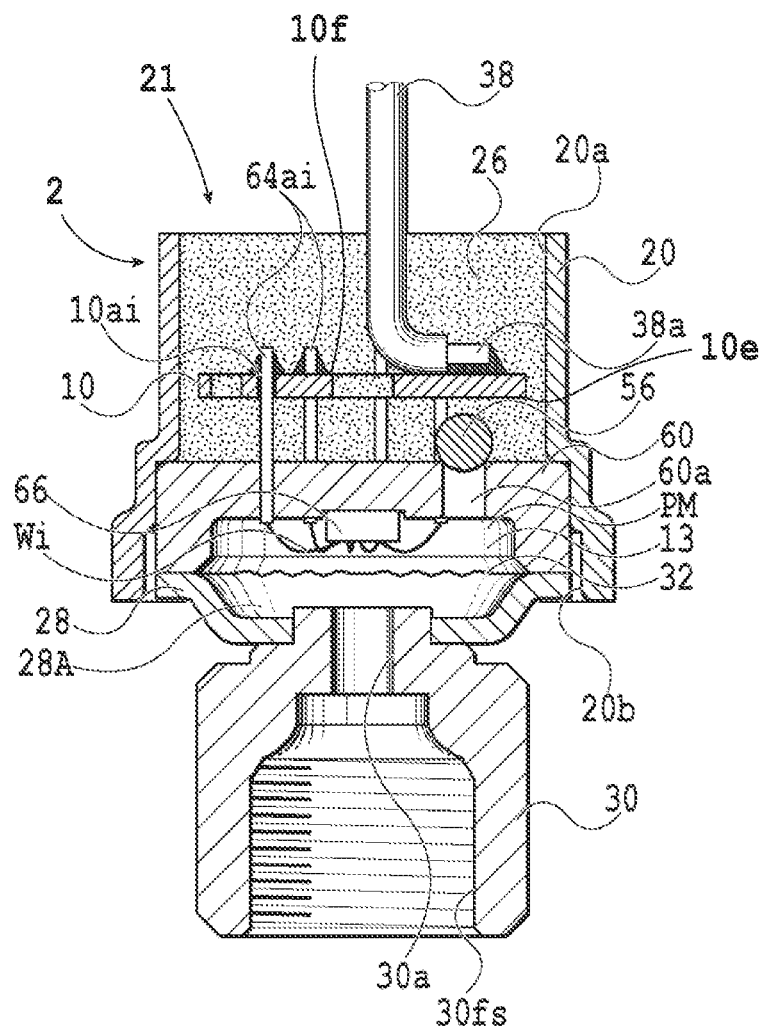
FIG. 9 is a cross-sectional view showing a configuration of still another example of a pressure sensor according to the present invention.

FIG. 9 schematically shows a configuration of still another example of a pressure sensor according to the present invention. The pressure sensor shown in FIG. 9 comprises the joint member 30 to be joined to the piping that guides the fluid to be subjected to detection of a pressure, and a sensor housing 60 in which the joint member 30 is connected to the base plate 28 by brazed joint or the like, the sensor housing for accommodating the sensor unit. The sensor housing 60 is an insulating member made of a material such as a ceramic that maintains pressure resistance and airtightness.

Note that components in FIG. 9 identical to the components shown in the example illustrated in FIG. 2 will be denoted by identical reference numerals and overlapping explanations thereof will be omitted.

The sensor unit for detecting a pressure inside the pressure chamber 28A and transmitting the detection output signal comprises, as its main components: the metal diaphragm 32 for isolating the pressure chamber 28A from an inner peripheral portion of the sensor housing 60; the sensor chip 66 provided with a plurality of pressure detection elements and the signal processing electronic circuit unit for processing the signals from the pressure detection elements; and the grouped input-output terminals 64$ai$ (i=1 to 8) electrically coupled to the sensor chip 66.

The pressure transmission medium PM is put in through a hole 60$a$ in the sensor housing 60 and then the hole 60$a$ is occluded by the plug member 56. The input-output terminals constituting the grouped input-output terminals 64$ai$ are inserted into and supported by corresponding holes in the sensor housing 60, respectively. The sensor chip 66 is cemented to an inner peripheral surface of the sensor housing 60. The grouped input-output terminals 64$ai$ and the sensor chip 66 are connected to one another by using the bonding wires Wi.

Two of the grouped input-output terminals 64$ai$ are used as the power supply terminals (Vcc, GND), for example, and another one of the grouped input-output terminals 64$ai$ is used as the transmission terminal (Vout) for the output signal from the sensor chip 66, for example. The rest of the terminals are used as the five adjustment terminals, respectively. Both end portions of each input-output terminals project toward an end portion of an inner peripheral surface of the above-described sensor housing 60 and to the corresponding one of the through-holes 10$ai$ (i=1 to 8) in the substrate 10, respectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A pressure sensor comprising:
   a sensor unit including:
      a sensor chip for detecting a pressure and transmitting a detection output signal,
      at least one input-output terminal electrically coupled to the sensor chip, and
      a supporting member for supporting the sensor chip;
   a connector electrically coupled to the input-output terminal; and
   a sensor unit accommodating portion filled with a sealant, for accommodating the connector and the sensor unit, wherein
   the connector includes plurality of bubble discharge openings for pushing out and discharging a bubble into an internal space of the sensor unit accommodating portion and into outside being continuous with the internal space when the sensor unit accommodating portion is filled with the sealant, wherein at least one bubble discharge opening of the plurality of the bubble discharge openings is formed between an outer peripheral portion at a lower end of a connection port portion and an inner peripheral portion of a terminal base in the connector at predetermined intervals along a circumferential direction of the connection port portion.

2. The pressure sensor according to claim 1, wherein the sensor unit further comprises a housing including an insulating member for supporting the input-output terminal.

3. The pressure sensor according to claim 1, wherein the supporting member is a chip mounting member made of a metal and supported and insulated from the sensor unit.

4. The pressure sensor according to claim 1, further comprising:
   a substrate supported by one end of the input-output terminal and electrically coupled to the connector, wherein
   the substrate includes at least one bubble discharge opening added to the plurality of bubble discharge openings extending through the substrate in a first direction and separated from the input-output terminal in a second direction traverse to the first direction by the substrate, the at least one bubble discharge opening being configured for pushing out and discharging a bubble on a first side of the substrate into a portion of the internal space of the sensor unit accommodating portion on a second side of the substrate, wherein the bubble is pushed out and discharged outside of the sensor unit accommodating portion when the sensor unit accommodating portion is filled with the sealant, wherein the at least one bubble discharge opening is filled with the sealant after filling the sensor unit accommodating portion with the sealant.

5. The pressure sensor according to claim 4, wherein the at least one bubble discharge opening in the substrate is a communication hole in the substrate.

6. The pressure sensor according to claim 4, wherein the at least one bubble discharge opening in the substrate is a cutout on the substrate.

7. The pressure sensor according to claim 4, wherein the at least one bubble discharge opening in the substrate is provided adjacent to one of a plurality of the input-output terminals which is solder-fixed to the substrate.

8. A pressure sensor comprising:
   a sensor unit including:
      a sensor chip for detecting a pressure and transmitting a detection output signal,
      at least one input-output terminal electrically coupled to the sensor chip, and
      a supporting member for supporting the sensor chip;
   a connector electrically coupled to the input-output terminal;
   a substrate supported by one end of the input-output terminal and electrically coupled to the connector; and
   a sensor unit accommodating portion filled with a sealant, for accommodating the connector and the sensor unit,
   the connector includes bubble discharge opening for pushing out and discharging a bubble into an internal space of the sensor unit accommodating portion and into outside being continuous with the internal space when the sensor unit accommodating portion is filled with the sealant, and
   the substrate includes at least one bubble discharge opening extending through the substrate in a first direction and separated from the input-output terminal in a second direction traverse to the first direction by the substrate, the bubble discharge opening being configured for pushing out and discharging a bubble on a first side of the substrate into a portion of the internal space of the sensor unit accommodating portion on a second side of the substrate, wherein the bubble is pushed out and discharged outside of the sensor unit accommodating portion when the sensor unit accommodating portion is filled with the sealant, wherein the at least one bubble discharge opening is filled with the sealant after filling the sensor unit accommodating portion with the sealant.

9. The pressure sensor according to claim 8, wherein the sensor unit further comprises a housing including an insulating member for supporting the input-output terminal.

10. The pressure sensor according to claim 8, wherein the bubble discharge opening in the substrate is a communication hole in the substrate.

11. The pressure sensor according to claim 8, wherein the bubble discharge opening in the substrate is a cutout on the substrate.

12. The pressure sensor according to claim 8, wherein the bubble discharge opening in the substrate is provided adjacent to one of a plurality of the input-output terminals which is solder-fixed to the substrate.

13. The pressure sensor according to claim 8, wherein the supporting member is a chip mounting member made of a metal and supported and insulated from the sensor unit.

\* \* \* \* \*